United States Patent [19]
Quednau et al.

[11] Patent Number: 5,882,393
[45] Date of Patent: Mar. 16, 1999

[54] DISPERSING AGENT

[75] Inventors: Peter Hermann Quednau, Hillegom; Frank Oliver Heinrich Pirrung, JT Alkmaar, both of Netherlands

[73] Assignee: Efka Chemicals B.V., Hillegom, Netherlands

[21] Appl. No.: 849,520

[22] PCT Filed: Jan. 22, 1997

[86] PCT No.: PCT/NL97/00021

§ 371 Date: Sep. 23, 1997

§ 102(e) Date: Sep. 23, 1997

[87] PCT Pub. No.: WO97/26984

PCT Pub. Date: Jul. 31, 1997

[30] Foreign Application Priority Data

Jan. 24, 1996 [NL] Netherlands .................. 1002167

[51] Int. Cl.$^6$ .................. C09D 7/02; B01F 17/32
[52] U.S. Cl. .................. 106/287.2; 106/287.21; 106/253; 252/356; 252/357; 252/363.5; 540/1; 544/400; 548/253; 548/261; 548/262.4; 548/267.6; 548/309.7; 548/336.1; 548/375.1; 548/400; 548/324.1; 548/560; 548/561
[58] Field of Search .................. 106/253, 287.2, 106/287.21; 252/356, 357, 363.5; 540/1; 544/400; 548/262.4, 261, 253, 267.6, 309.7, 336.1, 375.1, 400, 324.1, 561, 560

[56] References Cited

FOREIGN PATENT DOCUMENTS 0019844  5/1980  European Pat. Off. ........ B01F 17/00

*Primary Examiner*—David Brunsman
*Attorney, Agent, or Firm*—Cooper & Dunham LLP

[57] ABSTRACT

The invention relates to a dispersing agent or salts thereof, comprising the reaction product of:

A one or more polyisocyanates with an average functionality of about 2 to about 5, with B a compound of the type Y—R—X, wherein Y represents a ring structure with at least one nitrogen atom in the ring, R represents a chain of at least three atoms and X has the meaning O—R$^1$ or N(R$^1$)(R$^2$), wherein R$^1$ is H or a group of the formula R$^3$—Z, wherein R$^3$ represents a chain with at least two atoms and Z represents OH or NH$_2$, and R$^2$ represents a group of the formula R$^3$—Z, which compound is obtainable through reaction of an acrylate compound or an epoxide compound with a cyclic compound which has at least one group of the structure

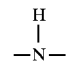

in the ring.

11 Claims, No Drawings

DISPERSING AGENT

This is a 371 of International Application No. PCT/NL97/00021 filed Jan. 22, 1997.

The present invention relates to dispersing agents or salts thereof, based on a compound containing at least one ring structure with at least one nitrogen atom in the ring.

The invention further relates to the use of dispersing agents, powdered or fibrous solid substances (fillers, pigments and the like), to be included in liquid systems, which are coated with such dispersing agents, as well as a number of new compounds which are suitable for preparing dispersing agents according to the invention.

To introduce solid substances into liquid media, high mechanical forces are necessary. This depends to a large extent on the solid substance's wettability by the surrounding medium, as well as on the affinity for this medium. In order to reduce these dispersing forces, it is conventional to use dispersing agents which facilitate incorporating the substances. This mostly concerns surface-active agents or surfactants, of anionic or cationic or non-ionic structure. In relatively low amounts of addition, these agents are either applied directly to the solid substance or added to the dispersing medium. Through such a surfactant, the energy required for the dispersion is considerably reduced.

Further, it is known that such solid substances, after dispersion, tend to reagglomerate, which nullifies the initially induced dispersing energy and leads to serious problems. This phenomenon can be explained by inter alia London/van der Waals' forces, by which the solid substances are mutually attracted. In order to nullify these attractive forces, adsorption layers should be provided on the solid substances. This occurs through the use of such surfactants or polymers.

During and after the dispersion, however, there arises an interaction of the surrounding medium with the solid particle, so that a desorption of the surfactant can arise in exchange for the surrounding medium present in a higher concentration. However, in most cases this surrounding medium is incapable of building up such stable adsorption layers, so that the entire system flocculates. This is evidenced by inter alia an increase of the viscosity in liquid systems, loss of gloss, color shifts in lacquers and coatings, insufficient development of coloring power in pigmented plastics and lacquers, as well as a decrease of the mechanical strength in reinforced plastics.

In European patent applications 154.678, 438.836 and 520.586 dispersants are described, based on the reaction product of a polyisocyanate with a functionality of 2.5 to 6 with a compound containing a ring structure with at least one basic nitrogen atom in the ring.

These known dispersants are typically based on cyclic compounds which are attached to the polyisocyanate via an amino- or hydroxy-functional side chain. Compounds representative thereof are 1-(2-aminoethyl)piperazine, 2-amino-6-methoxybenzothiazole, 4-(2-aminoethyl) pyridine, 4-(aminomethyl)pyridine, 3-amino-1,2,4-triazole, 1-(3-aminopropyl)imidazole, 4-(2-hydroxyethyl)pyridine and 1-(2-hydroxyethyl)imidazole.

These known products are useful for a large number of applications. However, a disadvantage, among others, is that the products based on the above-mentioned nucleophilic compounds are limited in the solids content that is acceptable in practice. Commercial products generally have a solids content in the order of magnitude of 25 to 35% by weight. An object, among others, of the invention is to provide a dispersing agent that makes it possible to arrive at higher solids contents.

SUMMARY OF THE INVENTION

Surprisingly, it has now been found that this objective can be realized by the use of a specific type of nucleophilic compounds.

Accordingly, the invention relates to dispersing agents or salts thereof, comprising the reaction product of:

A one or more polyisocyanates with an average functionality of about 2 to about 5, with B a compound of the type Y—R—X, wherein Y represents a ring structure with at least one nitrogen atom in the ring, R represents a chain of at least three atoms, and X has the meaning O—$R^1$ or N($R^1$) ($R^2$), wherein $R^1$ is H or a group of the formula $R^3$—Z, wherein $R^3$ represents a chain with at least two atoms and Z represents OH or $NH_2$, and $R^2$ represents a group of the formula $R^3$—Z, which compound is obtainable through reaction of an acrylate compound or an epoxide compound with a cyclic compound which has at least one group with the structure

in the ring.

The dispersing agents according to the invention have the advantage that a considerably higher solids content can be achieved at equal effectiveness, which is favourable with a view to reducing the environmental impact by solvents.

Also, an advantage of the use of the specific component Y—R—X is that it is simpler to prepare than most of the above-mentioned nucleophilic compounds.

The moiety with the structure —R— which is used according to the invention in any case has a chain of a length of at least three atoms between the groups Y and X.

DETAILED DESCRIPTION OF THE PREFERRED EMBODIMENTS

According to a first variant of the invention, it is preferred that R has a carbonyl group at the γ-position with respect to the Y group, i.e. that the compound is based on the reaction of an acrylate compound with the ring-nitrogen. In such a case, in accordance with the invention, the free acid can be used (X=OH), or an ester or amide. Highly suitable are the reaction products of hydroxyethyl and hydroxypropyl esters of acrylic acid and methacrylic acid, (preferably acrylic acid) with a suitable ring structure, which results, for instance, in the following derivatives of the ring structure with the following substituents on the nitrogen atom: propionic acid 2-hydroxyethylyl ester, propionic acid 2-hydroxypropyl ester, 2-methyl-propionic acid 2-hydroxyethylyl ester, 2-methyl-propionic acid 2-hydroxypropylyl ester, and ethoxylated and/or propoxylated derivatives thereof. It is noted that these are novel compounds.

According to another preferred variant of the invention, the compound Y—R—X has been obtained through reaction of an epoxide with the ring structure. More particularly glycidol is then used, which results in a 1,2-dihydroxypropyl substituent on the nitrogen atom of the ring structure.

According to the invention, X has the meaning O—$R^1$ or N($R^1$)($R^2$), wherein $R^1$ is H or a group of the formula $R^3$—Z, wherein $R^3$ represents a chain with at least two atoms and Z represents OH or $NH_2$, and $R^2$ represents a group of the formula $R^3$—Z. In practice, this means that the compound contains a hydroxide group or an amine group. In case X has the meaning O—R$^1$, the compound will generally be hydroxy-functional. Conversely, the compound will mostly be aminofunctional if X is represented by N(R$^1$)(R$^2$).

For the heterocyclic group Y, the starting point are generally the various cycloaliphatic and aromatic, heterocyclic compounds with one or more nitrogen atoms in the ring, at least one of the nitrogen atoms having a proton. Examples thereof are piperazine, imidazoline, benzimidazole, imidazole, pyrrolidine, pyrazole, 1,2,4-triazole, benzotriazole, indazole, 1-H-tetrazole, as well as substituted derivatives thereof. Most preferred are pyrrolidine, 1,2,4-triazole, pyrazole, imidazole and derivatives thereof.

The compounds of the type Y—R—X can be prepared by reaction of acrylate or epoxy compounds with heterocyclic compounds with at least one group with the structure

Such a reaction can often occur through a simple reaction of the components, if desired in a suitable inert solvent, at elevated temperature or not. If desired, in the reaction with acrylate compounds a catalyst can be used which is known to catalyze the Michael addition. In general, however, the reaction is exothermic, and no catalyst is needed.

The reaction with the epoxy compound generally proceeds exothermically, so that after the start of the reaction further work proceeds adiabatically or under cooling.

According to the invention, it is possible to prepare the compounds of type B as such and to allow them to react with the polyisocyanate. In an alternative embodiment, however, it is also possible first to react the acrylate or epoxy compound with the polyisocyanate and then to carry out the addition of the heterocyclic compound to the reaction product obtained.

According to a preferred embodiment of the invention, the dispersing agent is a reaction product of A, B and C at least one monohydroxy and/or monocarboxylic acid compound, and D at least one dihydroxy, diamine, dicarboxylic acid, and/or monohydroxy-monocarboxylic acid compound.

Surprisingly, it has now been found that the dispersing agents according to the invention exhibit a good compatibility with, for instance, alkyd resins and oil-free polyester resins, a good solubility and a good dispersing action for various pigments difficult to stabilize. Also, owing to the high solids content that can be achieved, the dispersing agents are suitable for use in 'high-solids' lacquers as well as in so-called low-solvent lacquers.

According to the invention, in the dispersants a polyisocyanate with the functionality of about 2 to about 5, preferably about 4, is used. Suitable polyisocyanates are those described in European patent applications 438.836 and 520.586, whose content is incorporated herein by way of reference.

The polyisocyanate compounds are mostly commercial products which often do not have the above-specified formulas in pure form, but consist of mixtures of certain compounds with similar structural forms. 'Average functionality' is understood to mean that the commercial products, in respect of the isocyanate groups, have the indicated functionality of about 2 to about 5, preferably about 4.

Used as compound C is at least one monohydroxy compound or a monocarboxylic acid compound with an aliphatic and/or cycloaliphatic hydrocarbon, which can optionally be substituted with aryl and/or halogen groups{, or also contain one or more ether and/or ester groups}.

If desired, the hydrocarbon chain can be interrupted by amide, ether, ester, S, SO$_2$ and/or urethane groups. Preferably, the monohydroxy or monocarboxylic acid compound has a molecular weight of at least 300 and more particularly between 750 and 8000. Given these molecular weights, an optimum dispersing action is obtained. It is further also possible to provide in the compound one or more substituents which increase the compatibility with alkyd resins.

It is important, however, that the monohydroxy compound in question contains, besides the hydroxyl or carboxyl group, no substituents that are reactive with isocyanates under the conditions of the preparation of the dispersing agent according to the invention.

As monohydroxy or monocarboxylic acid compounds, aliphatic, cycloaliphatic and/or araliphatic compounds can be used. Mixtures of such compounds can also be used. They can be linear and branched aliphatic or araliphatic compounds. These can be saturated or unsaturated. Saturated compounds are preferred. The hydrogen atoms can be partly replaced with halogens, preferably with fluorine and/or also chlorine. If such substituted compounds are used, they preferably concern aliphatic monoalcohols. There are commercially available products in which, as is known to one skilled in the art, the carbon atoms in the proximity of the hydroxyl group generally possess no halogen atoms. Examples of especially fluorinated alcohols are heptadecafluorodecanol or C$_6$F$_{13}$CH$_2$CH$_2$OH. The commercially available products are often not uniform but mixtures of different fluorinated compounds, such as they are obtained in the technical synthesis.

As C compounds it is also possible to use those containing at least one —O— and/or —COO— and/or —CONH— group. This concerns polyethers, polyesters, polyamides or mixed copolymeric structures thereof. Examples for polyesters are those which can be obtained through polymerization of a lactone, such as propiolactone, valerolactone, caprolactone or substituted derivatives thereof using a monohydroxy or monocarboxylic acid starting component. Used as starting component are monoalcohols, effectively with 4 to 30, preferably from 4 to 14 carbon atoms, such as n-butanol, longer, saturated and unsaturated alcohols, such as propargyl alcohol, oleyl alcohol, linoleyl alcohol, oxo alcohols, cyclohexanol, phenylethanol, neopentyl alcohol, but also fluorinated alcohols as described above. It is also possible to use alcohols of the above-described types and substituted and unsubstituted phenols which have been converted through alkoxylation according to known methods with ethylene oxide and propylene oxide to polyoxyalkylene monoalkyl, aryl, aralkyl and cycloalkyl ethers. Mixtures of the above-mentioned compounds can also be used.

These polyesters have an effective molecular weight of about 300 to 8000, preferably 500 to 5000.

Monohydroxy polyethers that can be obtained through alkoxylation of alkanols, cycloalkanols and phenols can also be used. These polyethers effectively have a molecular weight of about 350 to 1500.

Polyamides can be obtained by condensation of diamines with dicarboxylic acids, or by polymerisation of lactams, such as caprolactam, 2-azacyclo-octanone and substituted derivatives thereof. This preparation can be analogous to the one described for lactones started with alcohol. Copolymers can be obtained by alcohol or amine started ringopening polymerisation of lactones or lactams. The effective molecular weight of these amide-group containing chains is about 300 to about 8000, preferably about 500 to about 5000.

It is also possible to use a combination of one or more of the above-mentioned monofunctional hydroxy compounds with one or more low-molecular monofunctional hydroxy compounds with a molecular weight of 32 to 200, more particularly of 50 to 200. These low-molecular compounds can also be used advantageously to deactivate the residual, unreacted —NCO— groups. Preferably, propanol, butanol, methoxypropanol or isomers thereof are used. An excess, if any, of such compounds then functions as co-solvent.

In the dispersant, preferably a radical of the difunctional compound D is also present. This can be a dihydroxy, a diamine, a dicarboxylic acid compound or a monohydroxy-monocarboxylic acid compound. Preferably used for that purpose is a hydrocarbon compound where at least eight carbon atoms are located between the functional groups. If desired, this carbon chain can be interrupted by amide, ether, ester, S, $SO_2$ and/or urethane groups. In general, it is preferred, for improving the compatibility of the dispersing agent with various materials, that the molecular weight of the radical is at least 200, more particularly between 750 and 4000.

In a more general formulation, the invention relates to the use of the above-mentioned reaction product as a component in dispersing agents, for instance based on the polyisocyanates mentioned, or based on other polymeric structures such as polyesters or acrylates.

The dispersing agents of the invention accordingly possess an amount of functional basic groups. According to the prior art, these basic groups are also characterized by their pKa value (as defined in EP-A 438.836). Preferred are compounds with basic groups with a pKa value of 2 to 14, more particularly of 5 to 14, and most preferably of 5 to 12. An example thereof is imidazole. Through these basic groups, the addition compounds are capable of forming salts. According to the invention, they can also be used as dispersant in the form of such salts.

These salts are obtained from the obtained basic reaction product through neutralization with organic or inorganic acids or through quaternization. Salts with organic monocarboxylic acids and sulfonic acids are preferred.

The conversion of isocyanate groups occurs using known methods. In general, it is preferred to carry out the reaction in such a manner that in a first stage the polyisocyanate is converted with a mixture of compounds C and D. This conversion generally takes place in a suitable solvent (e.g. hydrocarbons such as xylene, ethers such as dioxane, esters such as butyl acetate, and dimethylformamide), optionally in the presence of a catalyst such as dibutyltin dilaurate, ferrous acetylacetonate or triethylenediamine. It is also possible first to convert the polyisocyanate with the compound C and to convert the reaction product further with the compound D.

After this conversion, whereby generally about 40–80% of the isocyanate groups are converted, the reaction with the compound Y—R—X is carried out. This will lead to a conversion of about 20 to 60% of the isocyanate groups. Any isocyanate groups which have not reacted are finally deactivated through reaction with a lower alcohol or a comparable compound. In particular butanol is suitable for that purpose.

The invention will now explained in and by some examples, but is not limited thereto.

EXAMPLE 1

Synthesis of 3-benzimidazol-1-yl-propionic acid 2-hydroxyethyl ester.

Under a nitrogen atmosphere, in a three-necked flask provided with a mechanical stirrer, 25.0 g benzimidazole (0.212 mol) are suspended in 14.2 g 2-hydroxyethyl acrylate (0.212 mol), at room temperature. This is diluted with 39.2 g secondary butanol. The contents of the flask are heated to 50° C., until an exothermic reaction occurs, whereby the temperature rises to about 95° C. within a few minutes. The reaction mixture is cooled to 85° C. and then stirred at this temperature for 2 h. Upon further cooling, the adduct crystallizes. After filtration and concentration by evaporation the title product is left as a light-brown solid substance (Amine value=239.5 mg KOH/g, mp=95–98° C.). The product is stored dry or dissolved in NMP (=N-Methyl-pyrrolidone, 50%).

IR $\nu$ (cm$^{-1}$, CHCl$_3$): 3300 (OH), 2350, 1725 (CO), 1495, 1450, 1380, 1195, 1080, 750.

$^1$H NMR $\delta$ (CDCl$_3$, 400 MHz, ppm): 7.99 (s, 1H, NCHN); 7.60 and 7.39 (2 m, 1H and 3H, 4 Ar—H); 4.51 (t, 2H, J=6.4 Hz, NCH$_2$); 4.19 (m, 2H, OCH$_2$C); 3.76 (m, 2H, CH$_2$OH); 2.91 (t, 2H, J=6.4 Hz, CCH$_2$CO); 2.00 (bs, 1H, OH).

$^{13}$C NMR $\delta$ (CDCl$_3$, 100 MHz, ppm): 170.7 (CO), 143.3 and 143.2 (Ar—Cq, 2 rotamers), 133.1 (Ar—Cq), 123.1, 123.1, 122.3 and 120.1 (4 Ar—CH), 109.3 (N=C—N); 66.6 (C—OH); 59.9 (O—CH$_2$); 40.2 (CH$_2$—N), 34.1 (C—CO).

EI MS (70 eV) m/z (rel. intensity): 234 (M$^{\circ+}$, 25); 191 (58); 173 (7); 146 (23); 145 (23); 131 (100); 118 (40); 104 (13); 90 (21); 77 (18); 63 (7).

HRMS: calculated for C$_{12}$H$_{14}$O$_3$N$_2$ 234.10044; found 234.20027.

EXAMPLE 2

Synthesis of 1,2-dihydroxy-3-benzimidazol-1-yl-propane

Under a nitrogen atmosphere, at 20° C., 15.94 g benzimidazole (0.135 mol) and 25.94 g NMP are provided in a three-necked flask equipped with a mechanical stirrer. The contents of the flask are heated to 100° C. At 100° C. glycidol is slowly added dropwise to the reaction mixture. An exothermic reaction takes place (maximum 105° C.). Upon completion, stirring occurs for 2 h at about 80° C. The dark-red product has an amine value of 145.9 mgKOH/g and a viscosity of 200 cP (60 rpm, #4, 20° C.).

IR $\nu$ (cm$^{-1}$, CHCl$_3$): 3500 (OH), 2910, 1570, 1500, 1455, 1375, 1335, 1255, 1110, 1050, 745.

$^1$H NMR $\delta$ (CDCl$_3$, 250 MHz, ppm, rotamers): 7.90–7.00 (m, 4H, 4 Ar—H); 7.72 (s, 1H, N=CH—N); 4.40–4.00 (m, 2H, CH—OH and OH); 3.70–3.40 (m, 2H, CH$_2$); 2.10 (s, 1H, OH).

$^{13}$C NMR $\delta$ (CDCl$_3$, 63 MHz, ppm, 2 rotamers): 142.7 and 142.6 (Ar—Cq); 133.8 and 133.7 (Ar—Cq); 123.3–119.4 (4 Ar—CH); 110.0 and 109.9 (N=C—N); 70.0 and 67.5 (CH—OH); 65.8 and 63.7 (CH$_2$—OH); 48.3 and 47.8 (N—CH$_2$).

EI MS (70 eV) m/z (rel. intensity): 192 (M$^{\circ+}$, 17); 174 (5); 133 (6); 132 (41); 131 (100); 118 (17); 104 (16); 77 (21); 51 (6).

EXAMPLE 3

Synthesis of 3-pyrazol-1-yl-propionic acid 2-hydroxyethyl ester

Under a nitrogen atmosphere, in a three-necked flask provided with a mechanical stirrer, at room temperature, 11.91 g pyrazole (0.175 mol) are suspended in 20.32 g HEA (0.175 mol). The contents of the flask are heated to 130° C.

This reaction mixture is then stirred for 2.5 h. The clear yellow oil (viscosity 110 cP (60 rpm, #4, 20° C.; amine value 304.5 mgKOH/g; color 3 (Gardner)) is stored dry.

IR ν (cm$^{-1}$): 3300 (OH), 2940, 1710 (CO), 1390, 1270, 1180, 1080, 1050, 1020, 980, 930, 870, 800, 750.

$^1$H NMR δ (CDCl$_3$, 250 MHz, ppm): 7.45–7.30 (m, 2H, 2 Ar—H); 6.20–6.10 (m, 1H, N—CH=N); 4.39 (t, 2H, J=6.1, CH$_2$OH); 4.20 (bs, 1H, OH), 4.15 (s, 2H, N—CH$_2$); 3.75–3.65 (m, 2H, O—CH$_2$—C); 2.85–2.77 (m, 2H, CH$_2$—CO).

$^{13}$C NMR δ (CDCl$_3$, 63 MHz, ppm): 171.0 (CO); 139.7, 129.9 and 105.7 (3 Ar-CH); 66.4 (CH2OH); 60.2 (O—CH2); 47.4 (N—CH2); 35.4 (CH2CO).

EI MS (70 eV) m/z (rel. intensity): 184 (M$^{°+}$, 25); 166 (4); 154 (17); 141 (18); 123 (48); 96 (25); 94 (13); 81 (100); 69 (21); 68 (41); 55 (34); 55 (11); 53 (9).

EXAMPLE 4

Synthesis of 3-(2-phenyl-2-imidazolin-1-yl) propionic acid 2-hydroxyethyl ester

The method of Example 3 is repeated, except that 14.62 g 2-phenyl-2-imidazoline (0.100 mol) and 11.61 g HEA (0.100 mol) are used. Exothermic reaction starts at 30° C., whereby the temperature rises to about 67° C. After exotherm the temperature is maintained at 70° C. for 2.5 h. The clear yellow oil (viscosity 72,000 cP (6 rpm, #4, 20 ° C.; amine value 213.9 mgKOH/g; color 10 (Gardner)) is stored dry.

IR ν(cm$^{-1}$): 3125 (OH), 2960, 2920, 1715 (CO), 1600, 1580, 1560, 1430, 1380, 1320, 1260, 1165, 1110, 1050, 1020, 940, 770, 695.

$^1$H NMR δ(CDCl$_3$, 250 MHz, ppm, rotamers): 7.70–7.30 (m, 5 H, 5 Ar—H); 4.20–4.00 (m, 2H, CH2—OH); 4.00–3.60 (m, 4H, 2 N—CH$_2$ and N—CH$_2$(ring)); 3.50–3.25 (m, 4H, O—CH$_2$ and N—CH2(ring)); 2.56 (t, 2H, J=6.9 Hz, CH$_2$—OH); 2.75 (bs, 1H, OH).

$^{13}$C NMR δ(CDCl$_3$, 63 MHz, ppm, 2 rotamers): 171.8 and 167.6 (CO); 131.1 and 130.7 (Ar—Cq); 130–127 (5 Ar—CH and 1 Ar—Cq); 66.3 and 62.2 (CH$_2$—OH); 63.6 and 60.7 (O—CH$_2$); 53.3, 53.3, 53.2, 51.1, 51.0, 45.2 (3 CH$_2$); 34.1 and 34.0 (CO—CH$_2$).

EI MS (70 eV) m/z (rel. intensity): 262 (M°Hu +, 10); 261 (15); 219 (22), 173 (10), 159 (68), 146 (5), 117 (100), 104 (10), 77 (17), 56 (43).

EXAMPLE 5

Synthesis of 3-(1H,2,4-triazol-1-yl)-propionic acid 2-hydroxyethyl ester (5a) and 3-(1,2,4H-triazol-4-yl)-propionic acid 2-hydroxyethyl ester (5b)

The method of Example 3 is repeated, except that 13.81 g 1,2,4-triazole (0.200 mol) and 23.22 g HEA (0.200 mol) are used. The temperature is adjusted to 75° C. (exothermically to about 65° C.). After the exotherm the temperature is held at 75° C. for 2.5 h. After cooling, the yellow oil (mixture from 5a and 5b, mole ratio about 85:15) slowly becomes a solid white powder (amine value 303 mg KOH/g, mp 104°–107° C.).

IR ν(cm$^{-1}$): 3115, 2350, 1730 (CO), 1520, 1460, 1260, 1200, 1140, 1060, 960, 870, 665, 635.

$^1$H NMR δ(CDCl$_3$, 400 MHz, ppm): 5a: 8.40–8.15 (m, 2H, 2 Ar—CH); 4.51 (t, 2H, J=6.1 Hz, NCH$_2$); 4.25 (dd, 2H, J=4.4, 2.6 Hz, O—CH$_2$); 3.82 (dd, 2H, J=2.9, 4.7 Hz, CH$_2$—OH); 2.93 (t, 2H, J=6.0 Hz, CH$_2$—CO); 4.30 (bs, 1H, OH); 5b: 8.00–7.90 (m, 2H, 2 Ar—CH); 4.45 (t, 2H, J=6.2 Hz, NCH$_2$); 4.38 (t, 2H, J=6.0 Hz, O—CH$_2$); 4.20–4.30 (m, 2H, CH$_2$—OH); 2.85 (t, 2H, J=6.0 Hz, CH$_2$—CO); 3.77 (s, 1H, OH).

$^{13}$C NMR δ(CDCl$_3$, 100 MHz, ppm) 5a (rotamers): 170.5 and 170.1 (CO); 151.1 and 151.1 (Ar—CH); 143.6 and 143.0 (Ar—CH); 66.4 and 66.2 (CH$_2$—OH); 59.5 and 59.4 (CH$_2$—O); 44.7 and 44.5 (NCH$_2$); 33.7 and 33.4 (CH$_2$—CO). 5b (symmetry): 170.5 1 (CO); 146.2 (2 Ar—CH); 63.0 (CH$_2$—OH); 62.2 (CH$_2$—O); 40.5 (NCH$_2$); 34.8 (CH$_2$—CO).

EI MS (70 eV) m/z (rel. intensity): 185 (M$^{°+}$, 1); 155 (16); 140 (8); 124 (31); 97 (27); 96 (45); 82 (16); 70 (23); 69 (19); 55 (100).

HRMS: calculated for C$_7$H$_{11}$O$_3$N$_3$ 185.07995; found 185.08006.

EXAMPLE 6

Synthesis of 3-(1H-benzotriazol-1-yl)-propionic acid 2--hydroxyethyl ester (6a) and 3-(2H-benzotriazol-2-yl)-propionic acid 2-hydroxyethyl ester (6b)

The method of Example 3 is repeated, except that 17.87 g benzotriazole (0.150 mol) and 17.42 g HEA (0.150 mol) are used. The temperature is adjusted to 100° C. and held at 100° C. for 2.5 h. The clear yellow oil (mixture from 6a and 6b, ratio 40:60) (viscosity 3600 cP (60 rpm, #4, 20° C.); amine value 238.5 mg KOH/g; color 7 (Gardner)) is stored dry.

IR ν(cm$^{-1}$): 3380 (OH), 1950, 1730 (CO), 1395, 1190, 1085, 755.

$^1$H NMR δ(CDCl$_3$, 400 MHz, ppm): 6a: 7.85–7.75 (m, 2H, 2 Ar—CH), 7.35–7.25 (m, 2H, 2 Ar—CH); 5.01 (dd, 2H, J=6.3, 5.6 HZ, NCH$_2$); 4.25–4.20 (m, 2H, OCH$_2$); 4.20 (bs, 1H, OH); 3.76 (dd, 2H, J=4.4, 4.7 Hz, CH$_2$—OH); 3.11 (t, 2H, J=6.5 Hz, CH$_2$—CO). 6b: 7.96 (d, 1H, J=8.4 Hz, 1 Ar—CH), 7.54 (d, 1H, J=8.2 Hz, 1 Ar—CH), 7.45–7.35 (m, 1H, 1 Ar—H); 7.30–7.25 (m, 1H, 1 Ar—CH); 4.85 (t, 2H, J=6.6, NCH$_2$); 4.20–4.10 (m, 2H, OCH$_2$); 4.20 (bs, 1H, OH); 3.73 (dd, 2H, J=4.4, 4.7 Hz, CH$_2$—OH); 3.05 (dd, 2H, J=5.8, 6.6 Hz, CH$_2$—CO).

$^{13}$C NMR δ(CDCl$_3$,100 MHz, ppm): 6a: 170.0 (CO); 143.0 (Ar—Cq); 131.0 (Ar—Cq); 128–109 (4 Ar—CH); 64.0 (OCH$_2$), 62.0 (OCH$_2$), 51.9 (NCH$_2$), 35.0 (COCH$_2$); 6b: 171.0 (CO); 146.0 (Ar—Cq); 135.0 (Ar—Cq); 128–109 (4 Ar—CH); 66.6 (OCH$_2$), 60.4 (OCH$_2$), 43.4 (NCH$_2$), 34.2 (COCH$_2$).

EXAMPLE 7

Synthesis of 3-Imidazol-1-yl-propionic acid 2-hydroxypropyl ester

Under a nitrogen atmosphere, in a three-necked flask provided with a mechanical stirrer, at room temperature, 20.43 g imidazole (0.30 mol) are suspended in 39.06 g 2-hydroxypropyl acrylate (0.30 mol). The contents of the flask are heated to 40° C., until an exothermic reaction occurs, whereby the temperature rises to about 110° C. within a few minutes. The reaction mixture is cooled to 80° C. and then stirred at this temperature for 3 h. The clear yellow oil (amine value 271 mgKOH/g; color 4 (Gardner)) is quantitatively filtered off and stored dry.

EXAMPLE 8

Synthesis of 3-(2-methyl-imidazol-1-yl)-propionic acid 2-hydroxyethyl ester

The method of Example 3 is repeated, except that 12.32 g 2-methylimidazole (0.150 mol) and 17.42 g HEA (0.150 mol) are used. Exothermic reaction begins at 35° C. (exothermically to about 90° C.). After the exotherm the temperature is held at 75° C. for 2.5 h. The clear yellow oil (viscosity 7450 cP (60 rpm, #4, 20° C.); amine value 283 mg KOH/g) is stored dry.

IR $\nu(cm^{-1})$: 3300 (OH), 2980, 2940, 1725 (CO), 1490, 1410, 1380, 1310, 1275, 1180, 1140, 1120, 1070, 980.

$^1$H NMR $\delta(CDCl_3$, 400 MHz, ppm): 6.80–6.79 (m, 2H, 2 Ar—H); 4.70 (bs, 1H, OH); 4.20 and 4.15 (s and dd,2H,J= 4.7, 4.9, OCH$_2$2 rotamers); 4.09 (t, 2H,J=6.8, NCH$_2$); 3.74 and 3.64 (t and s, 2H, J=4.7 Hz, OCH$_2$2 rotamers); 2.69 (t, 2H, J=6.8, OCH$_2$); 2.33 and 2.31 (2s, 3H, 2 CH$_3$2 rotamers).

$^{13}$C NMR $\delta(CDCl_3$,100 MHz, ppm, rotamers): 170.4 and 170.0 (CO); 144.3 (Ar—Cq); 126.8 and 126.7 (Ar—CH); 118.9 and 118.8 (Ar—CH); 66.0 and 62.3 (HOCH$_2$); 63.3 and 59.4 (OCH$_2$); 41.1 and 40.9 (NCH$_2$); 35.0 and 34.8 (COCH$_2$); 12.5 and 12.4 (CH$_3$).

EXAMPLE 9

In a dry nitrogen atmosphere, 29.91 g toluene diisocyanate pentamer (about 50% in BuOAc) are dissolved in a mixture of 27.21 g butyl acetate and 23.94 g methoxypropyl acetate (MPA). To this are added 18.48 g mono-ol component, a caprolactone ester started with a monohydroxy compound, and the whole is stirred at 75° C. for 2 h. Then at 75° C. 4.47 g hydroxycarboxylic acid and 1.99 g polyethylene glycol 1000 are added, followed by 3.13 g butyl acetate. The reaction mixture is stirred for 2 h and cooled in 0.5 h to 60° C. Next, in 2 min. 13.10 g of the product of Example 1 (50% in NMP) are added dropwise and the whole is stirred at 60° C. for 1 h. In the last step the excess of free NCO-groups is captured with 2.60 g sec-butanol. After stirring for 1 h at 60° C. the solids content is corrected with BuOAc to 40% and the amine number is checked. The product 9 is clear.

Data: VS=40%, AG=13, viscosity=about 30000 cP, color 14 (Gardner).

EXAMPLE 10

Analogously to Example 9, 47.84 g toluene diisocyanate pentamer (about 50% in BuOAc) in 49.81 g butyl acetate and 12.00 g MPA are reacted with 37.80 g mono-ol at 75° C. After 2 h, 7.32 g hydroxycarboxylic acid are added at 75° C. After cooling to 60° C. 16.76 g of the product of Example 2 are slowly added dropwise and the whole is stirred for 1 h at 60° C. The excess of NCO-groups is captured by adding 3.08 g sec-butanol butanol and stirring for 1 h. The solids content of the product is corrected to 45% with butyl acetate.

Data: VS=45%, AG=14 , viscosity=about 15000 cP, color 17 (Gardner).

EXAMPLE 11

Analogously to Example 9, 29.06 g toluene diisocyanate pentamer (about 50% in BuOAc) in 38.00 g butyl acetate and 10.00 g MPA are reacted with 22.47 g mono-ol at 75° C. After 2 h 4.72 g hydroxycarboxylic acid are added at 75° C. After cooling to 60° C. 5.00 g of the product of Example 4 are slowly added dropwise and the whole is stirred for 1 h at 60° C. The excess of NCO-groups is captured by adding 1.89 g sec-butanol and stirring for 1 h. The solids content of product is corrected to 40% with butyl acetate.

Data: VS=40%, AG=9, viscosity=about 22000 cP, color 6 (Gardner).

EXAMPLE 12

Analogously to Example 9, 26.04 g toluene diisocyanate pentamer (about 50% in BuOAc) in 35.00 g butyl acetate and 9.83 g MPA are reacted with 22.47 g mono-ol at 75° C. After 2 h 4.72 g hydroxycarboxylic acid are added at 75° C. After cooling to 60° C. 3.93 g of the product of Example 4 are slowly added dropwise and the whole is stirred for 1 h at 60° C. The excess of NCO-groups is captured by adding 1.89 g sec-butanol and stirring for 1 h. The solids content is corrected to 40% with butyl acetate.

Data: VS=40%, AG=7.5 , viscosity=about 7000 cP, color 6 (Gardner).

EXAMPLE 13

Analogously to Example 9, 29.9 g toluene diisocyanate pentamer (about 50% in BuOAc) in 17.78 g butyl acetate and 17.70 g MPA are reacted with 20.43 g mono-ol at 75° C. After 2 h 6.10 g hydroxycarboxylic acid are added at 75° C. After cooling to 60° C., 5.55 g of the product of Example 8 are slowly added dropwise and the whole is stirred for 1 h at 60° C. The excess of NCO-groups is captured by adding 6.18 g sec-butanol and stirring for 1 h. The solids content is corrected to 45% with butyl acetate.

Data: VS=45%, AG=about 15 and the color 6 (Gardner).

EXAMPLE 14

The dispersing agents according to Examples 9–13 were tested in a 2-K hydroxy acrylate system with the pigment FW 200 (C.I.P.BK. 7, a critical pigment that is difficult to stabilize). The tests were carried out according to the formulation below.

| Mill base: | |
| --- | --- |
| Macrynal SM 510 n (60%) | 11.0 g |
| BuOAc | 6.35 g |
| Solvesso 100 | 6.35 g |
| FW 200 | 0.9 g |
| Dispersing agent | x* g |

*30% solid dispersing agent on pigment (45%-product: x = 0.60 g; 40%: x = 0.67; 35%: x = 0.77)

The mill base is ground for 1.5 h with two parts by weight of glass beads (2–3 mm) to a fineness<5 μm. Then 25.0 g Macrynal SM 510 (60%) are admixed and the whole is homogenized for 15 min. The two-component lacquer is completed as follows:

| Above-mentioned paste | 10.0 g |
| --- | --- |
| Desmodur N 75 | 2.5 g |
| BuOAc | 3.0 g |
| Efka-30, 10% in xylene | 0.1 g |

After homogenization, the paste is filtered and poured onto a polyester film at an angle of 60° and dried in air for 24 h. Post-drying for 30 min at 75° C.

The color of the transparent film is brown-black, which indicates an optimum deflocculation and a homogeneous particle size of about 13 nm.

| Product no. | Gloss 20° |
| --- | --- |
| 10 | 85 |
| 11 | 84 |
| 13 | 84 |

EXAMPLE 15

The dispersing agents according to Examples 9–13 were tested in a different lacquer system with two different pigments. The tests were carried out according to the formulation below.

| Mill base: | |
|---|---|
| Alftalat AC 451 (60%) | 2.9 g |
| Solvesso 100 | 6.6 g |
| Pigment * | 3.5 g |
| Dispersing agent 45% | 2.0 g |

* for this test two different pigments were used: Irgazinn red DPP-BO (C.I.P.R. 254) and Novoperm Orange HL-70 (C.I.P.O. 36).
Amount of dispersant 25.7% solid on pigment in both cases.

The mill base is ground for 1.5 h with two parts by weight of glass beads (2–3 mm) to a fineness<5 μm in the Scandex. Then the paste is completed with the products below and homogenized in the scandex for 15 min.

| Alftalat AC 451 (60%) | 19.8 g |
|---|---|
| Maprenal MF 650 | 10.5 g |
| Solvesso 100 | 10.8 g |
| E-30 (10% in xylene) | 0.5 g |

The lacquer which has formed is filtered off, poured on a polyester film at an angle of 60° and dried in air for minutes. Next, the lacquer film is cured at 130° C. for minutes.

| Pigment Example | Irgazinn red DPP-BO Gloss 20° | N. Orange HL 70 Gloss 20° |
|---|---|---|
| 9 | 80 | 81 |
| 11 | 76 | 76 |
| 12 | 76 | 76 |
| 13 | 77 | 75 |

We claim:

1. A dispersing agent or salts thereof, comprising the reaction product of:
A one or more polyisocyanates with an average functionality of about 2 to about 5, with
B a compound of the formula Y—R—X, wherein Y represents a ring structure with at least one nitrogen atom in the ring, R represents a chain of at least three atoms and X has the meaning O—R$^1$ or N(R$^1$) (R$^2$), wherein R$^1$ is H or a group of the formula R$^3$—Z, wherein R$^3$ represents a chain with at least two atoms and Z represents OH or NH$_2$, and R$^2$ represents a group of the formula R$^3$—Z, which compound is obtained by reacting constituents comprising an acrylate compound or an epoxide compound with a cyclic compound which has at least one group with the structure

in the ring.

2. A dispersing agent according to claim 1, comprising the reaction product of A, B and C at least one monohydroxy and/or monocarboxylic acid compound, and
D at least one dihydroxy, diamine, dicarboxylic acid, and/or monohydroxy-monocarboxylic acid compound.

3. A dispersing agent according to claim 1, wherein said compound with a ring structure with at least one nitrogen atom in the ring is selected from piperazine, imidazoline, benzimidazole, imidazole, pyrrolidine, pyrazole, 1,2,4-triazole, benzotriazole, indazole, 1-H-tetrazole, as well as substituted derivatives thereof.

4. A dispersing agent according to claim 3, wherein said compound is selected from pyrrolidine, 1,2,4-triazole, pyrazole, imidazole and substituted thereof.

5. A dispersing agent according to claim 1, wherein the group —R—X is based on acrylic acid, methacrylic acid, hydroxyethyl and hydroxypropyl esters of acrylic acid and methacrylic acid, as well as alkoxylated derivatives of acrylic acid and said esters.

6. A method for dispersing solid substances in a liquid, comprising:
adding an effective amount of a dispersing agent according any of claims 1–5 to a solid substance to obtain a mixture containing the solid substance and the dispersing agent.

7. A method in accordance with claim 6, further comprising adding the mixture to the liquid.

8. Powdered or fibrous solid substances, to be included in liquid systems, which are coated with a dispersing agent according to claim 1.

9. Lacquer containing a solid substance according to claim 8.

10. A compound with the structure Y—R—X, obtained by reaction of one or more compounds from the group consisting of glycidol, 2-hydroxyethylyl acrylate, 2-hydroxypropyl acrylate, 2-hydroxyethylyl methacrylate, 2-hydroxypropylyl methacrylate, and the ethoxylated and/or propoxylated derivatives thereof, with a cyclic compound which has at least one group with the structure

in the ring.

11. A method for preparing a compound Y—R—X, as defined in claim 6, comprising reacting one or more compounds from the group consisting of glycidol, 2-hydroxyethylyl acrylate, 2-hydroxypropyl acrylate, 2-hydroxyethylyl methacrylate, 2-hydroxypropylyl methacrylate, and the ethoxylated and/or propoxylated derivatives thereof, with a cyclic compound which has at least one group with the structure

in the ring.

* * * * *